United States Patent [19]

Kunieda et al.

[11] 4,323,629

[45] Apr. 6, 1982

[54] METALLIC THIN FILM MAGNETIC RECORDING MEDIUM

[75] Inventors: Toshiaki Kunieda, Minoo; Masaru Odagiri; Takashi Fujita, both of Kawanishi; Koichi Shinohara, Kobe, all of Japan

[73] Assignee: Matsushita Electric Industrial Co., Ltd., Osaka, Japan

[21] Appl. No.: 167,418

[22] Filed: Jul. 11, 1980

[30] Foreign Application Priority Data

Jul. 17, 1979 [JP] Japan .................... 54-91318

[51] Int. Cl.$^3$ .............................................. G11B 5/62
[52] U.S. Cl. .................... 428/457; 360/134; 360/135; 360/136; 148/31.55; 148/31.57; 75/134 F; 75/170; 427/132; 428/639; 428/668; 428/678; 428/680; 428/688; 428/900; 428/928
[58] Field of Search .................... 252/62.55; 427/132, 427/127, 128; 428/900, 694, 695, 692, 928, 639, 667, 686, 678, 457, 668, 680, 688; 360/134, 135, 136

[56] References Cited

U.S. PATENT DOCUMENTS

| | | | |
|---|---|---|---|
| 2,730,491 | 1/1956 | Moline et al. | 252/62.55 |
| 3,116,159 | 12/1963 | Fisher et al. | 148/31.55 |
| 3,150,939 | 9/1964 | Wenner | 428/928 |
| 3,206,325 | 9/1965 | Averbach | 428/900 |
| 3,700,500 | 10/1972 | Rodbell et al. | 428/629 |
| 3,893,824 | 7/1975 | Tadokoro et al. | 428/928 |
| 3,905,779 | 9/1975 | Tadokoro et al. | 428/928 |
| 4,136,049 | 1/1979 | Horiishi | 252/62.55 |
| 4,245,008 | 1/1981 | Michaelser | 428/611 |

FOREIGN PATENT DOCUMENTS

52-69816  6/1977  Japan .................... 75/170

*Primary Examiner*—Stanley S. Silverman
*Attorney, Agent, or Firm*—Burgess, Ryan and Wayne

[57] ABSTRACT

A magnetic thin film deposited on a non-magnetic substrate consists substantially of Ni, Co and oxygen, the content of Ni being between 10 and 55% by weight based on the weight of Ni and Co, the atomic percent ratio of oxygen to Ni and Co being between 3 and 45%.

3 Claims, 9 Drawing Figures

METALLIC THIN FILM MAGNETIC RECORDING MEDIUM

BACKGROUND OF THE INVENTION

The present invention relates to a metallic thin film recording medium and has for its object to improve not only its magnetic properties and resistance-to-corrosion but also its productivity.

There has been an increasing demand for high density magnetic recording, and the intensive research and development has been made in order to provide the metallic thin film magnetic recording media which can satisfy the demand for high-density recording. The processes for manufacture of metallic thin film magnetic recording media (to be referred interchangeably as "magnetic thin film" in this specification) can be divided in general into two types. One type is the wet type in which the magnetic thin film is deposited on the substrate by the chemical plating processes while the other is of the dry type using the sputtering, ion-plating or vacuum evaporation techniques. The dry process is advantageous over the wet process in that reproducibility of the magnetic properties of magnetic thin films is superior and the magnetic thin films are uniform both in longitudinal and width directions. In addition, in contrast to the wet process, the dry process can eliminate the pollution problems caused by the disposal of waste solution. Thus, the dry process has been long considered very advantageous in mass production of magnetic recording media.

The inventors made extensive studies and experiments on processes for forming ferromagnetic thin films over non-magnetic substrates of glass, metals or plastics by the sputtering, ion-plating or vacuum evaporation techniques and evaluated various characteristics such as the electric-magnetic conversion characteristics, applicability and so on which in turn determine the essential characteristics of the magnetic recording media. Then, the inventors found out that there exist some very serious problems which must be solved in order to obtain the magnetic recording media having satisfactory characteristics.

Firstly, in order to satisfy the demand for high density recording, the magnetic thin film must have a high coercive force, preferably of the order of 1000 Oe, as well as a high saturation magnetization. One of the most common methods for attaining a high coercive force is to incline a substrate at an angle to the direction of incidence of vapor when a magnetic thin film is formed. However, the inventors found out that when an evaporant is Ni, a magnetic thin film having as high a coercive force as 1000 Oe cannot be obtained at all at any angle of vapor incidence. In addition, it was also found out that in the case of an evaporant of Fe or Co, a magnetic thin film having a desired value of coercive force cannot be formed unless the angle of vapor coincidence is greater than 80°. At the angle of 80°, the vapor impinges against a substrate almost in parallel therewith so that the deposition rate becomes extremely slow. As a result, the exposure time must be increased with a resultant decrease in productivity and subsequent increase in cost which offers serious obstruction to the mass production on a commercial scale. Observations on the magnetic thin films deposited at such high angle of vapor incidence show that the packing factor drops by about 0.2 to 0.3 with the resultant decrease in magnetic density and subsequent failure in improving the recording density.

Secondly, the resistance-to-corrosion of the metallic thin film magnetic recording media is in general inferior to that of the prior art magnetic recording media of the type in which some magnetic oxide powders are dispersed in a plastic binder and coated onto the plastic substrate.

As a result of extensive studies and experiments, the inventors found out (I) that Ni has magnetic properties which are not satisfactory, but exhibits high resistance-to-corrosion and (II) that in the case of Co or Fe, satisfactory magnetic properties can be attained at a high angle of vapor incidence as described elsewhere, but Co or Fe has low resistance-to-corrosion. When a Co or Fe magnetic thin film is left in the atmosphere at a high humidity, spot-like corrosion is observed. As time elapses, the corrosion is further propagated and finally the thin film is separated from the substrate. Obviously, magnetic recording and reproduction is impossible with such magnetic media. In short, such magnetic media cannot be used in practice. Thus, separation of the thin film due to corrosion also offers serious obstacles to mass production.

SUMMARY OF THE INVENTION

The present invention was made to overcome the above and other problems encountered in the prior art magnetic recording media.

In brief, the present invention provides a metallic thin film recording medium in which a magnetic thin film deposited over a non-magnetic substrate consists substantially of Ni, Co and oxygen, the content of Ni being between 10 and 55% by weight based on the weight of Ni and Co, the atomic percent ratio of the oxygen to Ni and Co in the magnetic thin film being between 3 and 45%.

DESCRIPTION OF THE PREFERRED EMBODIMENT

Figure 1:
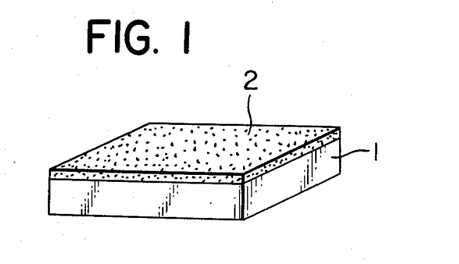
FIG. 1 is a perspective view of a metallic thin film magnetic recording medium in accordance with the present invention.

In FIG. 1 is shown in perspective a metallic thin film magnetic recording medium comprising a base or substrate 1 made of non-magnetic materials such as glass, plastic, metals or the like and a magnetic film 2 formed over the surface of the substrate by the sputtering, ion plating or vacuum evaporation of a ferromagnetic material of Co-Ni in an oxygen atmosphere.

Figure 2:
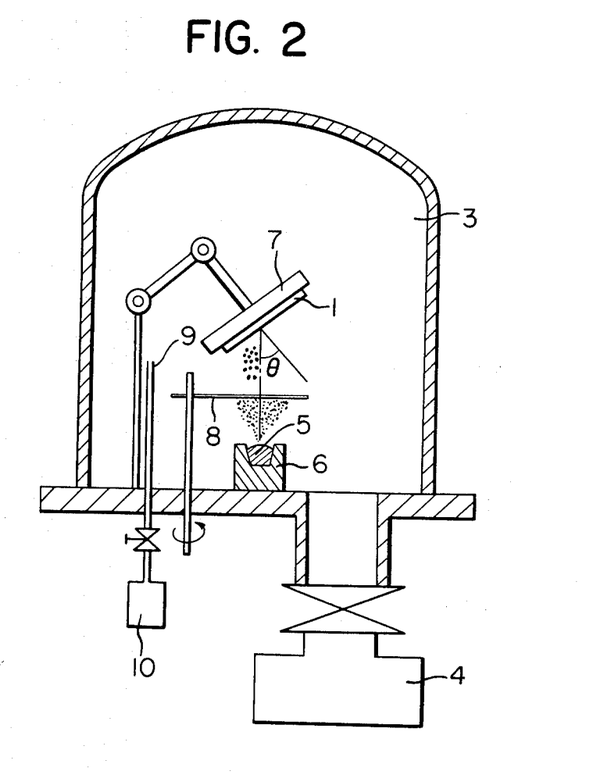
FIG. 2 is a front section of equipment used in the experiments conducted by the inventors.

In FIG. 2 is shown in front section the equipment used for experimental purposes. A processing chamber 3 is evacuated and maintained at a desired degree of vacuum by a vacuum pump system 4. Mounted on the bottom of the chamber 3 is an evaporation source 6 which heats, melts and evaporates a ferromagnetic material 5. A substrate 1 of glass, plastic, metal or the like is mounted on a substrate holder 7 with the angle of a vapor incidence of $\theta$ which can be arbitrarily selected as needs demand. In the experiments conducted by the inventors, this angle of vapor incidence is varied over a wide range as will be described in detail below.

A shutter 8 is interposed between the evaporation source 6 and the substrate 1 so that the substrate 1 can be exposed to the vapor for a predetermined time. An atmosphere gas inlet 9 is opened in the processing chamber 3 and is selectively communicated with an atmospheric gas container 10 outside of the chamber 3 so that various atmospheric gases can be used in the experiments.

SELECTION OF MAGNETIC FILM MATERIALS

Alloys of Co and Ni were investigated. The resistance of Co to corrosion is not satisfactory, but Co exhibits very satisfactory magnetic properties such as coercive force and squareness ratio. On the other hand, Ni has a high resistance to corrosion, but its magnetic properties are not so satisfactory.

Figure 3:
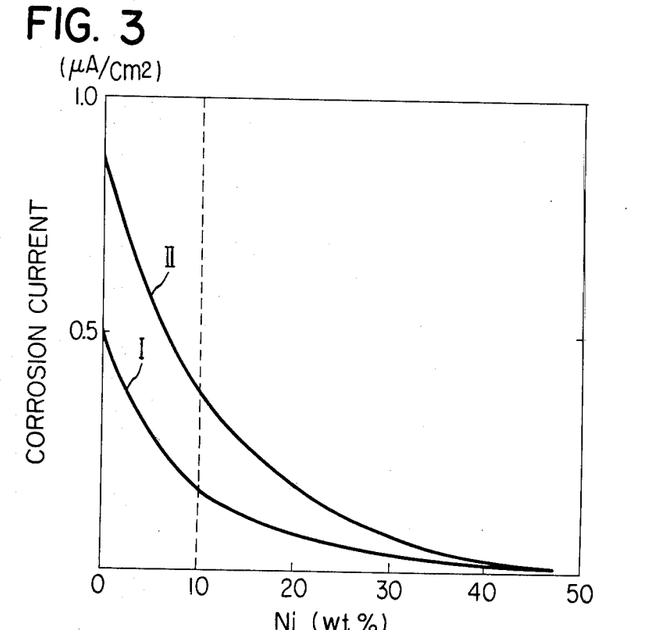
FIG. 3 is a graph showing the relationship between the corrosion current and the content of Ni in the magnetic thin films.
Figure 4:
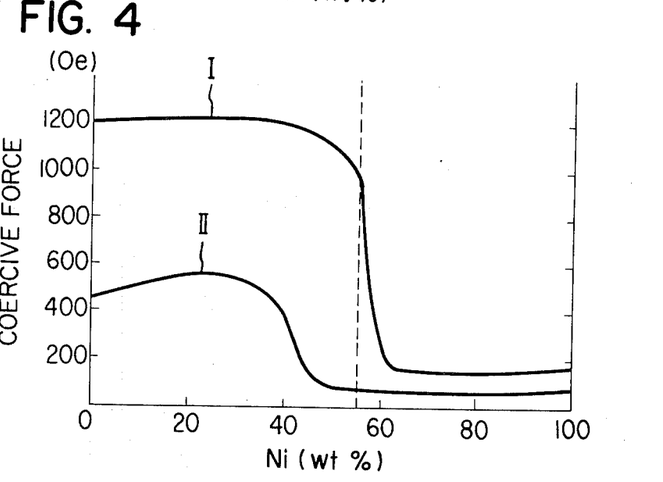
FIG. 4 is a graph showing the relationship between the coercive force and the content of Ni in the magnetic thin films.

In FIG. 3 are shown the relationships between the corrosion current and the content of Ni in Co-Ni alloys while in FIG. 4 are shown the relationships between the coercive force and the content of Ni. The corrosion current was measured by a potentiostat and in the measurements, a sample of 1 cm $\times$ 1 cm was immersed in a 3% solution of NaCl at 18° C. The coercive force was measured by VSM.

From FIG. 3 it is seen that the corrosion current exponentially decreases with increase in content of Ni. The decrease in corrosion current means that the corrosion rate of the magnetic thin film is low. One of the measures for evaluating the resistance to corrosion of magnetic tape is that no precipitation due to corrosion will be observed when a test tape has been left for one week in an atmosphere at high humidity of 90% and at 40° C. According to the experiments the inventors found out that in order to satisfy this condition, the content of Ni in the thin film deposited in the oxygen atmosphere must be higher than 10% as will be described below. The inventors also found out that even when the films are deposited in the residual gases, the above condition can be met by the increase in content of Ni.

It is seen from FIG. 4 that there exists a transition region in which the coercive force drops drastically when the content of Ni exceeds a certain point and a stabilized region in which the coercive force can be maintained at relatively low levels when the content of Ni is further increased.

Both the magnetic film (the curve I in FIG. 4) deposited in the oxygen atmosphere and the magnetic film (the curve II in FIG. 4) deposited in the residual gases exhibit similar tendencies. The transition region shifts slightly depending upon the film deposition conditions such as the angle of vapor incidence, the use or nonuse of oxygen, film thickness and so on.

The upper limit of the content of Ni must be decided so that as high a coercive force as possible can be obtained because the magnetic thin films are used as the magnetic recording media. The experimental results show that the decrease in coercive force by about 20 to 30% is observed when the content of Ni approaches 55%. In addition, parameters which measure the magnetic properties of the thin films vary over a wide range, and desired reproducibility and stability cannot be attained. Thus, the conclusion is that the Ni content must be less than 55%.

The experiments for obtaining the characteristic curves shown in FIGS. 3 and 4 were conducted under the conditions shown in TABLE below.

|  | I | II |
|---|---|---|
| angle of vapor incidence | 50° | 50° |
| film forming rate | 100 Å/sec | 100 Å/sec |
| oxygen flow rate | 0.01 l/min | 0 |
| film thickness | 1000 Å | 1000 Å |
| vacuum | 8 $\times$ 10$^{-5}$ torr | 5 $\times$ 10$^{-5}$ torr |
| substrate | polyimide | polyimide |

In summary, in order to attain resistance-to-corrosion and magnetic properties which are needed by magnetic thin films used for recording, Co-Ni alloys must be used and the content of Ni based upon that of Co must be greater than or equal to 10% but smaller than or equal to 55%.

Selection of Atmospheric Gases

It is well known in the art that vacuum evaporation at an inclined angle of vapor incidence can attain high coercive force. The inventors found out that the same is true for the case of deposition of Co-Ni alloys.

During the experiments conducted by the inventors, kinds and flow rates of gases to be introduced into the processing chamber were varied in order to attain satisfactory magnetic properties and resistance-to-corrosion, and the conditions under which the coercive force can be drastically increased even at low angles of vapor incidence were found out.

Figure 5:
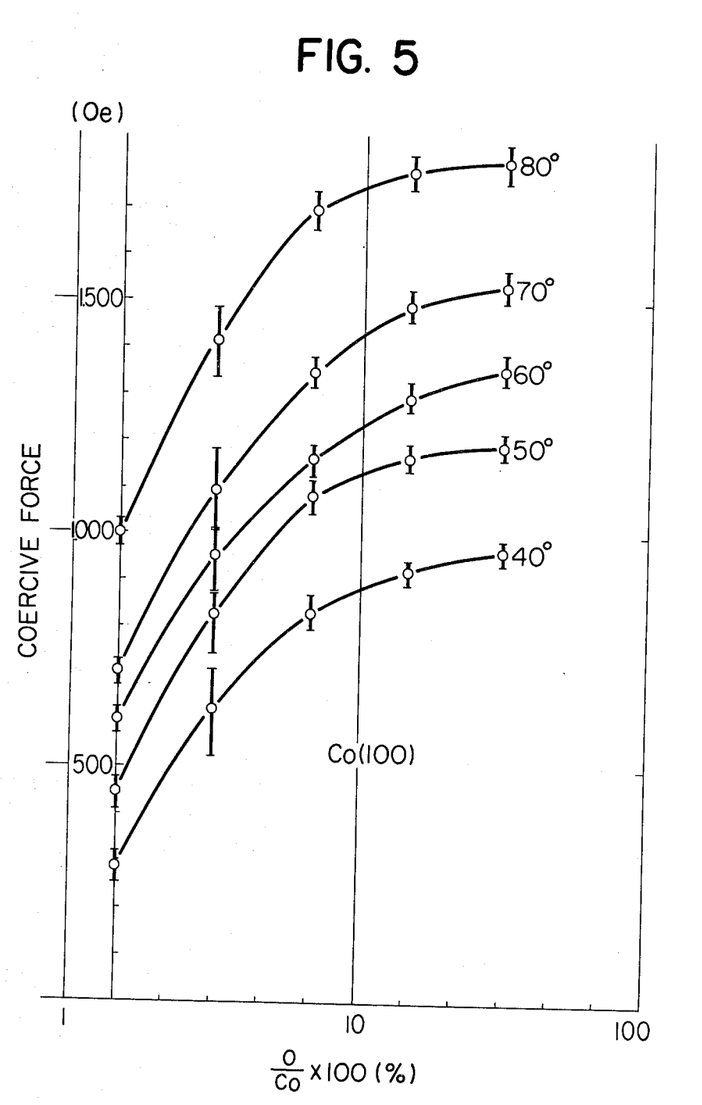
FIGS. 5 through 7 are graphs showing the relationship between the coercive force and the oxygen content in the magnetic thin films.
Figure 6:
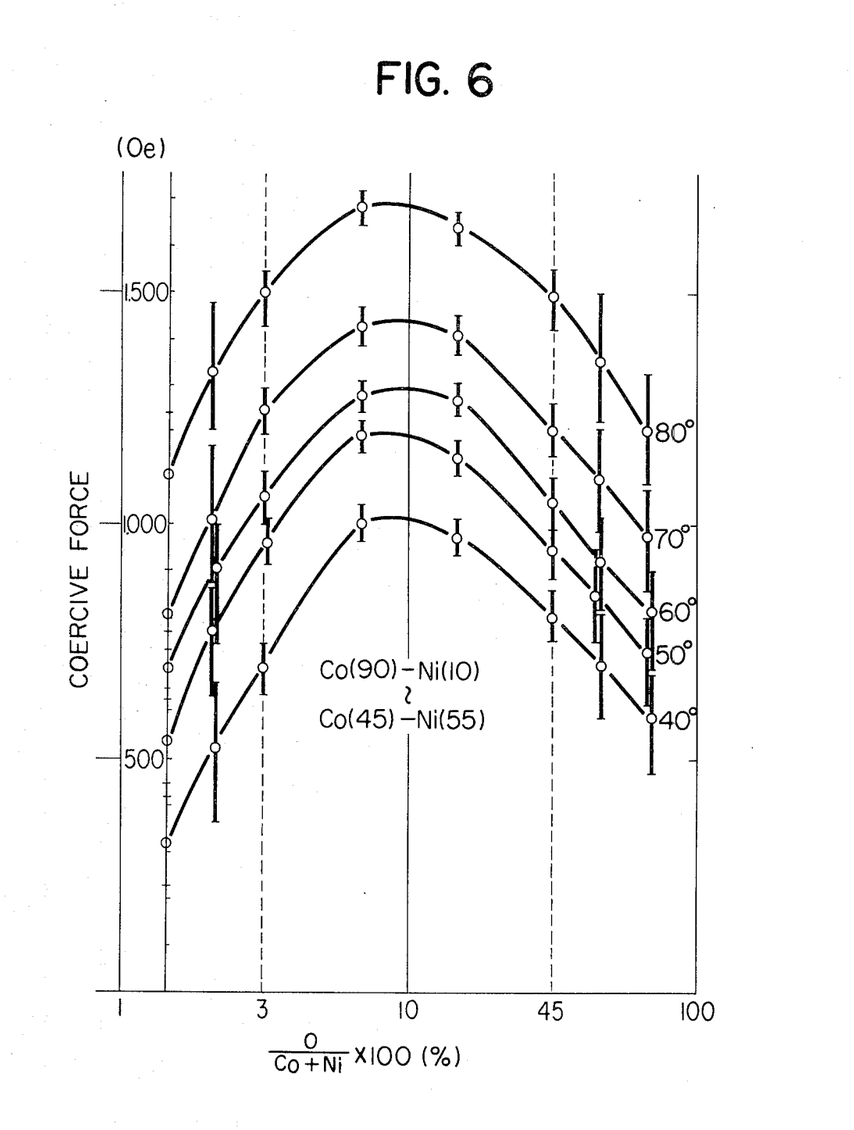
Figure 7:
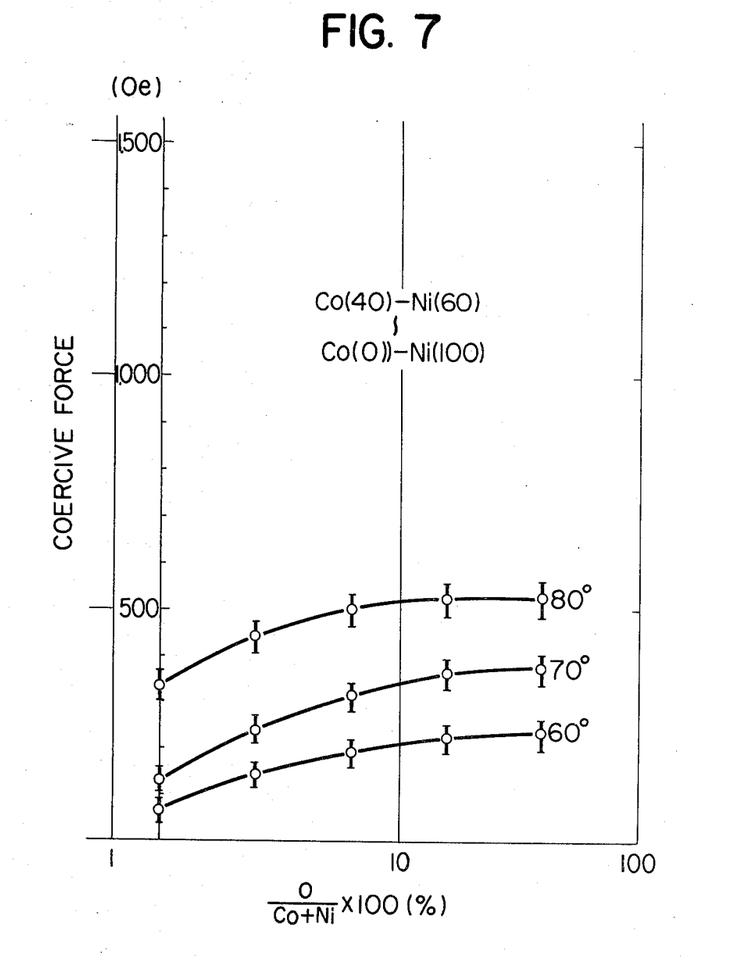

The inventors investigated $O_2$, $CO_2$, Ar, He, $CH_4$, $C_2H_4$. Of these, $O_2$ is very effective in improving the desired magnetic properties. The experimental results are shown in FIGS. 5, 6 and 7. The content of oxygen in film is plotted as abscissa while the coercive force, as ordinate. As shown in FIG. 5, when the thin films exclude Ni, the coercive force increases rather rapidly with increase in content of oxygen and then is saturated. As shown in FIG. 7 when the content of Ni is higher than 60%, the coercive force increases very gently with increase of oxygen content as compared with the drastic increase in coercive force with increase in oxygen content when thin films consist of Co alone as shown in FIG. 5. The oxygen content is expressed in % based upon the sum of Ni and Co atoms.

With the Co-Ni alloys with the content of 10%$\leq$Ni$\leq$55%, as shown in FIG. 6, the coercive-oxygen characteristic curve rapidly rises to a peak and then drops with increase in oxygen content. The inventors found out that the shape and peak of such concave-downward characteristic curve is dependent upon the deposition conditions especially such as the angle of vapor incidence, the thickness and the deposition rate.

It is one of the most significant observed facts that as with Co, the presence of oxygen further enhances the effects resulting from the inclination of the angle of vapor incidence.

The experiments for obtaining the characteristic curves as shown in FIGS. 5 through 7 were carried out under the following conditions:

| Angle of vapor incidence, ° | 40 | 50 | 60 | 70 | 80 |
|---|---|---|---|---|---|
| film formation rate, Å/sec | 100 | 100 | 80 | 50 | 20 |
| film thickness, Å | 1000 | 1000 | 1000 | 1000 | 1000 |
| substrate | poly-imide | poly-imide | poly-imide | poly-imide | poly-imide |

The coercive force was measured also by VSM and the oxygen contents were measured by Auger electron spectroscopy (AES), but X-ray photoelectron spectroscopy (XPS) and Ion microprobe analyzer (IMA) can be also used. As described elsewhere, the oxygen content is expressed in the percent ratio of the number of oxygen atoms to the sum of Co and Ni atoms in the magnetic thin film. Since the oxygen atoms are not uniformly distributed in the direction of thickness of the film, mean values are used.

Contents of Oxygen in Film

In general, the contents of oxygen must be so selected (1) that a higher coercive force can be obtained (See FIGS. 5 through 7) and (2) that from the standpoint of mass production, reproducibility and stability must be ensured.

In FIG. 6, the experimental data vary over a wide range when the oxygen content is less than 3% or greater than 45%. The variations in experimental data are shown by the vertical bars extended from the white dots indicating the mean values. A possible but not yet proved explanation is that when the oxygen content is less than 3%, the adverse effects of the residual gases on the formation of thin films are pronounced while when the oxygen contents is beyond 45%, the oxygen in excessive quantity adversely affects the crystal formation. In addition, when the oxygen contents exceeds 45%, the remarkable decrease in recording density results because of the synergistic effects of the decreases in coercive force, magnetic flux and squareness ratio.

When the oxygen content is less than 3%, corrosion of magnetic thin films in terms of the corrosion test standards described elsewhere was observed when the content of Ni is close to 10%.

Figure 8:
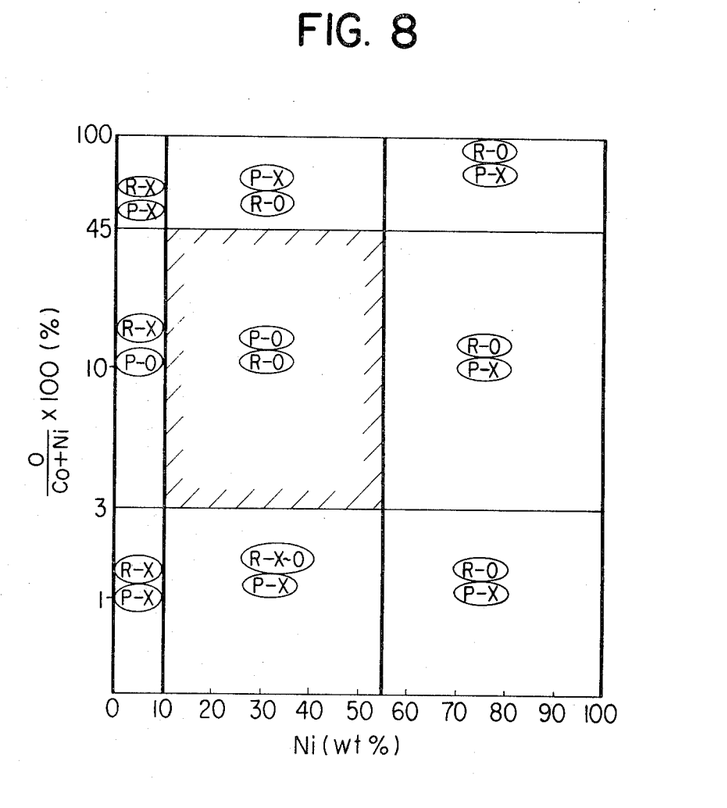
FIG. 8 is a chart showing coercive force and corrosion data with the contents of Ni and oxygen in the magnetic thin films as parameters.

The experimental results described in detail above can be summarized as shown in FIG. 8. That is, FIG. 8 shows the dependence of the degree of resistance-to-corrosion and the magnitude of coercive force upon the contents of both oxygen and Ni. The hatched rectangular region shows that both a higher degree of resistance-to-corrosion and a higher value of coercive can be obtained. In FIG. 8, the symbol P-O indicates a satisfactorily high coercive force while the symbol P-X, a low coercive force which is not satisfactory. In like manner, the symbol R-O indicates a satisfactorily high degree of resistance-to-corrosion while the symbol R-X, a low degree of resistance which is not satisfactory in practice.

Figure 9:
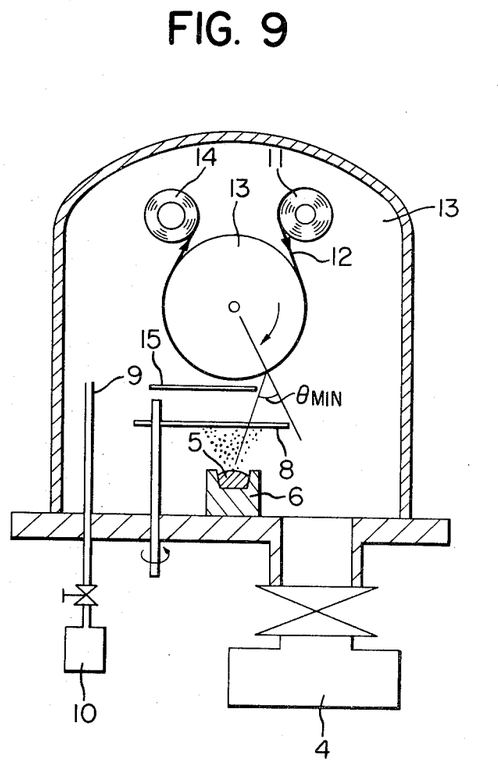
FIG. 9 is a front section of an apparatus adapted for the mass production of metallic thin film magnetic recording media in accordance with the present invention.

In FIG. 9 is shown an apparatus for the mass production of magnetic thin films in accordance with the present invention. This apparatus is substantially similar in construction to the equipment shown in FIG. 2 except that a film transport system is disposed within the processing chamber 3 so that the magnetic thin film can be continuously deposited over the film 12. The film transport system comprises a supply reel 11, a can 13 and a take-up reel 14. The film 12 unwound from the supply reel 11 is partly wrapped around the can 13 rotating in the direction indicated by the arrow and is taken up by the reel 14. The deposition of magnetic thin film is made at the bottom portion of the can 13, and a mask 15 is interposed between the shutter 8 and the can 13 in order to control the angle of vapor incidence $\theta$. The angle of vapor incidence $\theta_{min}$ is the smallest angle at which the vapor is incident on the film 12.

The magnetic properties as well as the resistance-to-corrosion of the magnetic tape fabricated by this apparatus are substantially equal to those summarized in FIG. 8.

According to the present invention, the relationships among Co, Ni and oxygen are limited so that the compositions of the magnetic thin films consisting of other elements than Ni, Co and oxygen fall within the scope of the present invention if the ratios among Ni, Co and oxygen are within the ratio limited by the present invention.

In addition to the experiments or tests described above, the magnetic thin films according to the present invention were also subjected to various environmental tests and were proved to have superior properties, but only the most significant results are presented in this specification.

In summary, according to the present invention, (i) the content of Ni in the magnetic thin films of Co-Ni alloys is between 10 and 55% by weight based on the total weight of Ni and Co and (ii) the ratio in % of the oxygen atoms to the sum of Co and Ni atoms in the magnetic thin films is between 3 and 45%. As a result, the following advantages can be attained:

(1) With the angle of vapor incidence of 40°, the magnetic properties equal to those attained with the angle of vapor incidence of 80° which has been generally used in the prior art. As a consequence, the productivity can be remarkably improved. More specifically, while the prior art feeds the film at the speed of 2 m/min, the present invention can feed it at a speed higher than 20 m/min. As to the resistance-to-corrosion in terms of the testing standards described elsewhere, no change of the magnetic thin film containing 30% of Ni was observed even after one month. Therefore there will be no problem at all in practice.

(2) The magnetic properties can be controlled with such high a tolerance of ±5% and with a higher degree of both reproducibility and stability.

(3) Since the magnetic thin films contain oxygen, the resistance-to-corrosion can be improved.

(4) Since the magnetic thin films contain oxygen, the strength of bond between the magnetic thin film and its substrate is remarkably improved.

Because of the above and other advantages, the present invention will greatly contribute to the mass production of metallic thin film magnetic recording media.

What is claimed is:

1. A metallic thin film recording medium comprising a magnetic thin film deposited from the vapor phase in an oxygen atmosphere on a non-magnetic substrate, said thin film consisting essentially of nickel, cobalt and oxygen;

the content of nickel being between 10 and 55 percent by weight based on the weight of nickel and cobalt; and the ratio of the oxygen atoms to the sum of the nickel and cobalt atoms in atomic percent being between 3 and 45 percent.

2. A metallic thin film recording medium as claimed in claim 1, wherein said magnetic thin film is deposited on said non-magnetic substrate from the vapor phase at an angle of deposition of from 40 to 80 degrees.

3. A metallic thin film recording medium as claimed in claim 1, wherein said non-magnetic substrate is a continuous strip thereof and said magnetic thin film is continuously deposited on said non-magnetic substrate.

* * * * *